Figure 1:
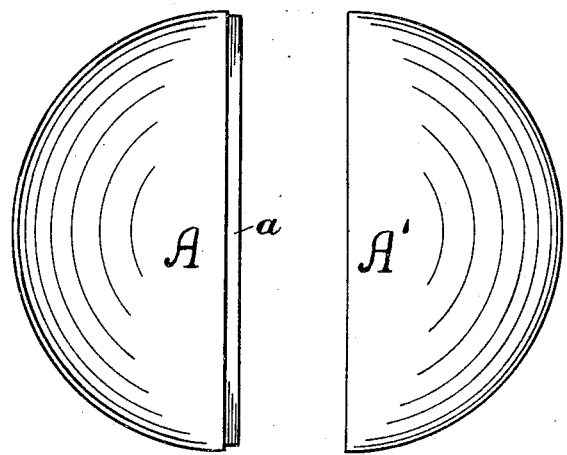

Sept. 10, 1929.   J. W. THOMPSON ET AL   1,727,525
FLOAT FOR WATER CISTERNS OR THE LIKE
Filed Jan. 19, 1925

Patented Sept. 10, 1929.

1,727,525

UNITED STATES PATENT OFFICE.

JOSEPH WILLIAM THOMPSON AND GEORGE PERCIVAL COOPER, OF LONDON, ENGLAND.

FLOAT FOR WATER CISTERNS OR THE LIKE.

Application filed January 19, 1925, Serial No. 3,492, and in Great Britain February 8, 1924.

This invention relates to improvements in or relating to floats for water cisterns.

Hitherto floats or balls for use in water cisterns and for such like purposes have been made in copper or other metal and the usual practice in a copper ball is to make the balls in halves, solder them together and solder on to one half a brass nipple which is internally screwed for the purpose of receiving a float rod. Balls of this nature have many disadvantages, e. g., where an acid water obtains in the cistern, the solder by which the brass nipple is secured to one half of the ball is attacked by the acid water; galvanic action being set up with the result that the ball portion falls away from the nipple and consequently flooding takes place, owing to the float rod being detached from the float. Moreover, copper balls of the nature described are not hygienic, the tendency of such after a time being to contaminate the water in which they float, and this is dangerous for the reason that tank water is very often consumed by individuals.

Prior to this invention it has also been common practice to make balls or floats of vulcanite, and in the process of manufacture it has been necessary to introduce gaseous salts, such as salts of ammonia, these salts being introduced inside the ball before the process of vulcanizing, so that the gas generated from the salts on expansion keeps the rubber before it has been vulcanized in the stove hard up against the inside of the ball or float mould. A certain amount of salts usually remain in the ball after manufacture and it is held to be objectionable, for this reason that when a ball bursts in the cistern or tank, the salts are dissolved in the water in the tank, and if this water is drunk, ill effects may result. Furthermore, balls may under this process have a tendency to break and also collapse due to condensation taking place inside the ball when salts remain therein, this being affected by varying temperatures to which the ball is sometimes subjected.

To overcome the difficulties and yet obtain a ball which outwardly is not affected by acid water and in which the outer covering is of insulating material, we proceed to manufacture a ball as follows, and this constitutes our invention.

A ball of metal or other suitable material is stamped, spun or formed in such a way that it in itself comprises a ball and it is made preferably in halves, one half being checked on its edge, whilst the other half is placed over the checked portion in such a way that a substantially flush joint obtains. One half of the ball at the spherical end is punched up internally for the purpose hereinafter described.

The halves of the ball so formed are put into a mould and covered with rubber or other suitable material and subsequently vulcanized. The metal portion of the ball, therefore, acts as a reinforced insert and there are no gases or salts obtaining in the interior. The one half of the ball which is pierced and punched up supports an internal boss which is drilled and punched to accommodate a valve spindle.

A metal ball covered with rubber and vulcanized (or any other suitable material) has the advantages that it will not dent as a copper ball does, it is practically unbreakable, it is hygienic and is virtually everlasting. It is not affected by varying temperatures. The covering on the metal insert is without any joints and the interior boss for the valve spindle is vulcanized and becomes as one with the outside covering of the insert.

As a modification, and in lieu of the insert having the rubber moulded on in a mould, strip rubber may be spun on to the insert and thereafter vulcanized.

In order that our invention may be more clearly understood, we have appended one sheet of drawings, in which Fig. 1 shows in halves an insert for the ball made of suitable reinforcing material, such as aluminum in case where the insert is of metal, or the insert may be of any other material which answers the purpose herein set forth.

Figure 2:
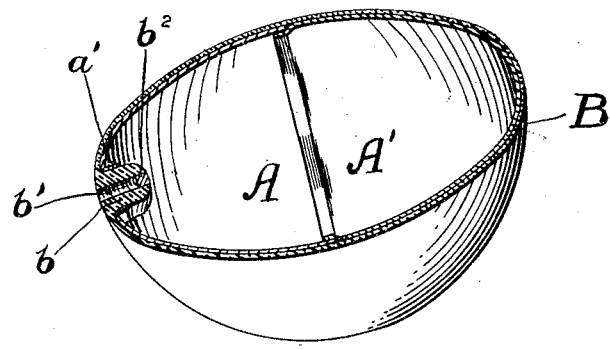

Fig. 2 shows a sectional elevation of a portion of the insert Fig. 1, same being covered with vulcanized rubber or similar suitable material.

Figure 3:
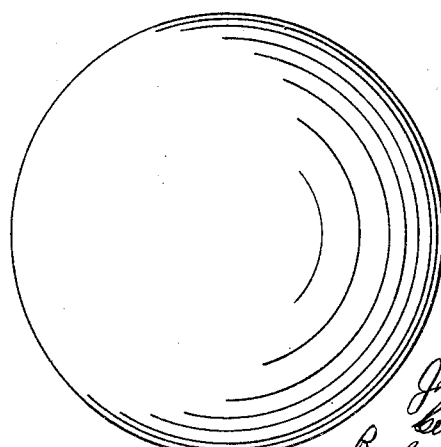

Fig. 3 shows the complete ball. In present practice the inserts are pressed in halves and have preferably a checked portion $a$ so that the halves A and A$^1$ can fit snugly together, and therefore comprise a perfect ball. One of the halves, say for example A, may have the internal punched up flange portion $a^1$ particularly for the purpose hereinafter referred to. B—Fig. 2—shows a half section of the ball or insert having a covering of rubber vulcanized or other insulating material of a like nature. Within the ball is a nipple $b$, also made out of the same material as the covering of the ball. This nipple is supported by the surrounding portion $a^1$ of the punched-up insert and the nipple is adapted to accommodate a valve rod at $b^1$ and with that end of the nipple which projects into the ball having a stop plug $b^2$.

It will, therefore, be obvious that the punched up flange portion $a^1$ provides a struck-up or off-set portion to support the thickened portion of the coating material forming the attaching nipple $b$.

Claims:

1. A float of the class described comprising a hollow metallic inner reinforcing member and a coating therefor, said reinforcing member being provided with an offset portion receiving a portion of said coating.

2. A float of the class described having a metallic inner reinforcing member provided with an offset portion, a covering for said reinforcing member and forming a nipple in said offset portion adapted to receive a valve rod.

3. A float of the class described consisting of a lining of metal provided with a struck-up portion, and a covering surrounding the lining, filling the said struck-up portion, said portion being adapted to receive an end of a valve rod.

4. A float of the class described comprising a hollow metallic casing having an opening, and a covering for said casing forming a nipple within said opening.

5. A float of the class described comprising a shell having a coating of material, said coating being thickened at one portion and provided with internal threads to provide means of attachment to a valve rod.

Dated this seventh day of January, 1925.

JOSEPH WILLIAM THOMPSON.
GEORGE PERCIVAL COOPER.